United States Patent
Kazluaskas et al.

[15] 3,702,913
[45] Nov. 14, 1972

[54] WELDING HEAD SUPPORTING APPARATUS

[72] Inventors: Gasparas Kazluaskas, North Hollywood; Mindaugas E. Gedgaudas, Valencia, both of Calif.

[73] Assignee: Astro-Arc Company, Sun Valley, Calif.

[22] Filed: April 21, 1971

[21] Appl. No.: 136,112

[52] U.S. Cl. .................... 219/60 A, 219/159, 228/45
[51] Int. Cl. ............................................. B23k 9/12
[58] Field of Search ......... 219/60 A, 60 R, 61, 125 R, 219/137, 159, 161; 228/45

[56] References Cited

UNITED STATES PATENTS

| | | |
|---|---|---|
| 3,176,897 | 4/1965 | Tucker ................. 219/60 A X |
| 3,135,850 | 6/1964 | Scheller et al. .......... 219/60 A |
| 3,102,187 | 8/1963 | Cascia ..................... 219/60 A |
| 3,042,787 | 7/1962 | Kotecki ................... 219/60 A |

*Primary Examiner*—J. V. Truhe
*Assistant Examiner*—L. A. Schutzman
*Attorney*—Robert E. Geauque

[57] ABSTRACT

An apparatus to support a welding apparatus which is to effect welding of cylindrical tubes wherein the welding apparatus is moved around the tubes by means of a roller being driven about a flexible band, the flexible band being held taut between a guide roller housing and a drive roller housing.

9 Claims, 5 Drawing Figures

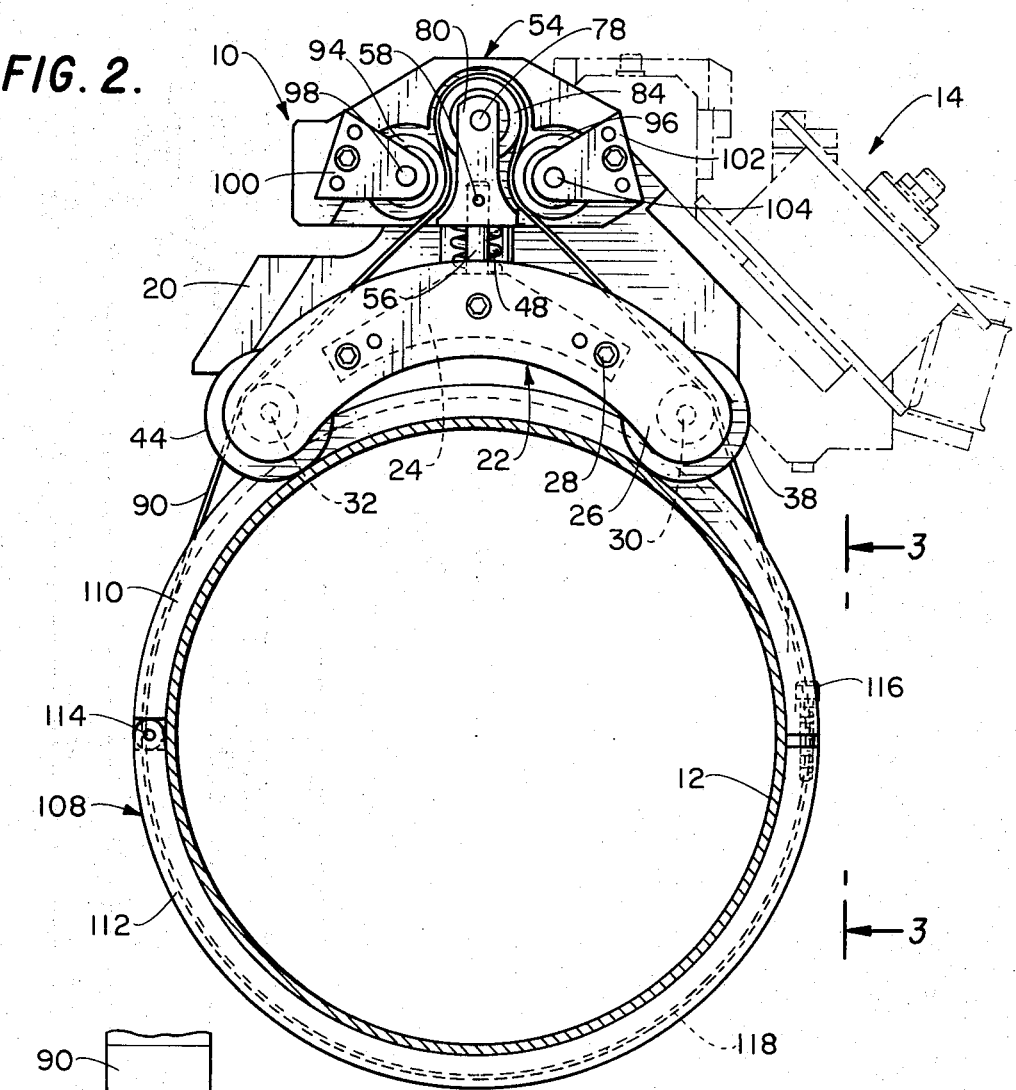
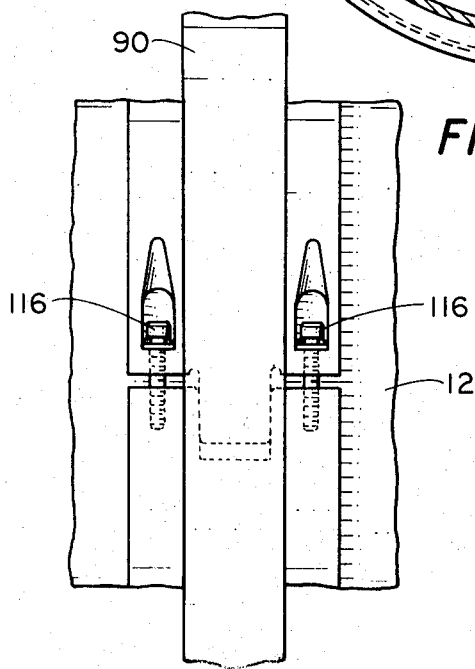

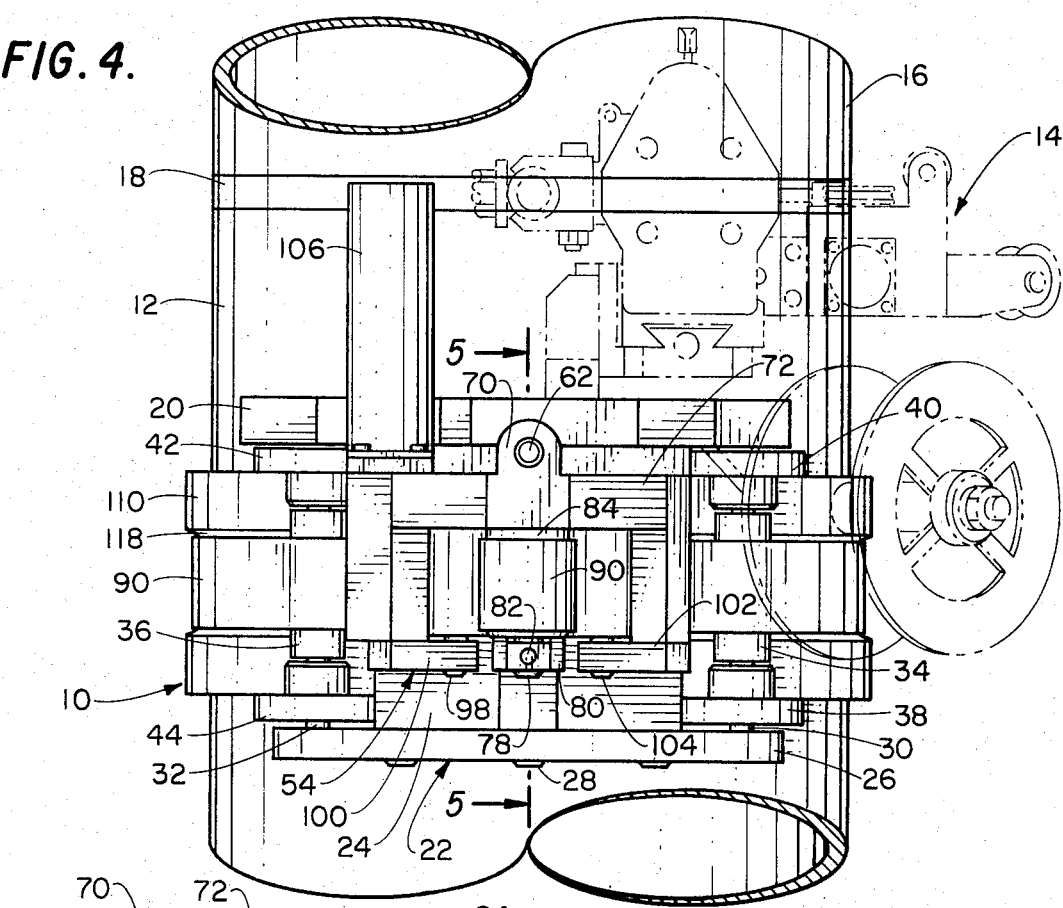
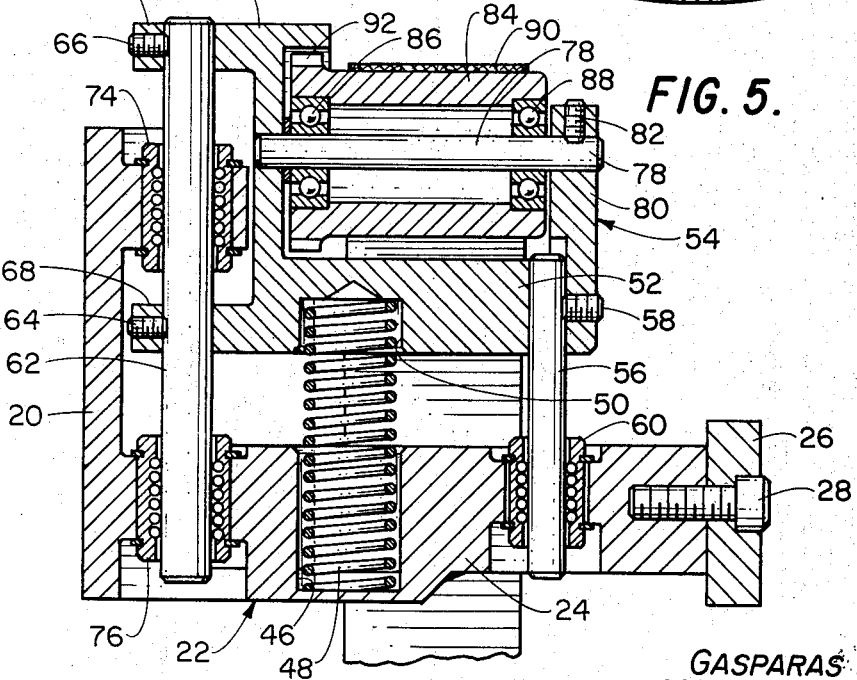

WELDING HEAD SUPPORTING APPARATUS

BACKGROUND OF THE INVENTION

The field of this invention relates to the welding of separate metallic cylindrical tubular elements by the gas shielded tungsten electro-arc welding process. More particularly, this invention relates to a supporting apparatus for a welding device to cause the welding device to move about the cylindrical tubes in a particular prescribed path. This invention contemplates an apparatus to effect automatic gas tungsten arc-welding along a circumferential path in tubular structures.

It is desirable to employ the use of a substantially less complex apparatus to effect welding of cylindrical tubes, particularly cylindrical tubes of larger diameters. It is desired that such an apparatus facilitate the welding operation efficiently, accurately and with a high degree of quality. Such an apparatus also should facilitate the location and removal of the apparatus with respect to the cylindrical tube.

SUMMARY OF THE INVENTION

The apparatus of this invention is designed to support a welding head apparatus which is to effect welding of cylindrical tubes. The welding head apparatus is to be fixedly secured to a guide roller housing. The guide roller housing includes a pair of spaced apart guide roller assemblies which is to be movable about a first cylindrical tube which is to be welded to a second cylindrical tube. Also, each of the guide roller assemblies is to cooperate with a guide track which is fixedly positioned about the first cylindrical tube. The drive roller housing is connected to the guide roller housing and is movable with respect thereto. The drive roller housing is under a constant bias tending to position the drive roller housing at the maximum displaced position from the guide roller housing. Within the drive roller housing are located drive rollers. A flexible band such as a belt is to cooperate with the drive rollers and also with each of the guide roller assemblies. The flexible band also cooperates with the guide track which is located about the first cylindrical tube. With the drive roller housing being displaced a maximum distance from the guide roller housing, the flexible band is maintained in a taut position. Upon the drive rollers being driven by means of a motor, movement of the apparatus of this invention (as well as the welding head apparatus) is caused about the first cylindrical tube.

BRIEF DESCRIPTION OF THE DRAWINGS

FIG. 2 is a partly-in-section view of the supporting apparatus of this invention taken along line 2—2 of FIG. 1;

FIG. 3 is a fragmentary view of a portion of the supporting apparatus of this invention taken along line 3—3 of FIG. 2;

FIG. 4 is a plan view of the overall arrangement shown in FIG. 1; and

FIG. 5 is a cross-sectional view through the supporting apparatus of this invention taken along line 5—5 of FIG. 4.

DETAILED DESCRIPTION OF THE SHOWN EMBODIMENT

Figure 1:
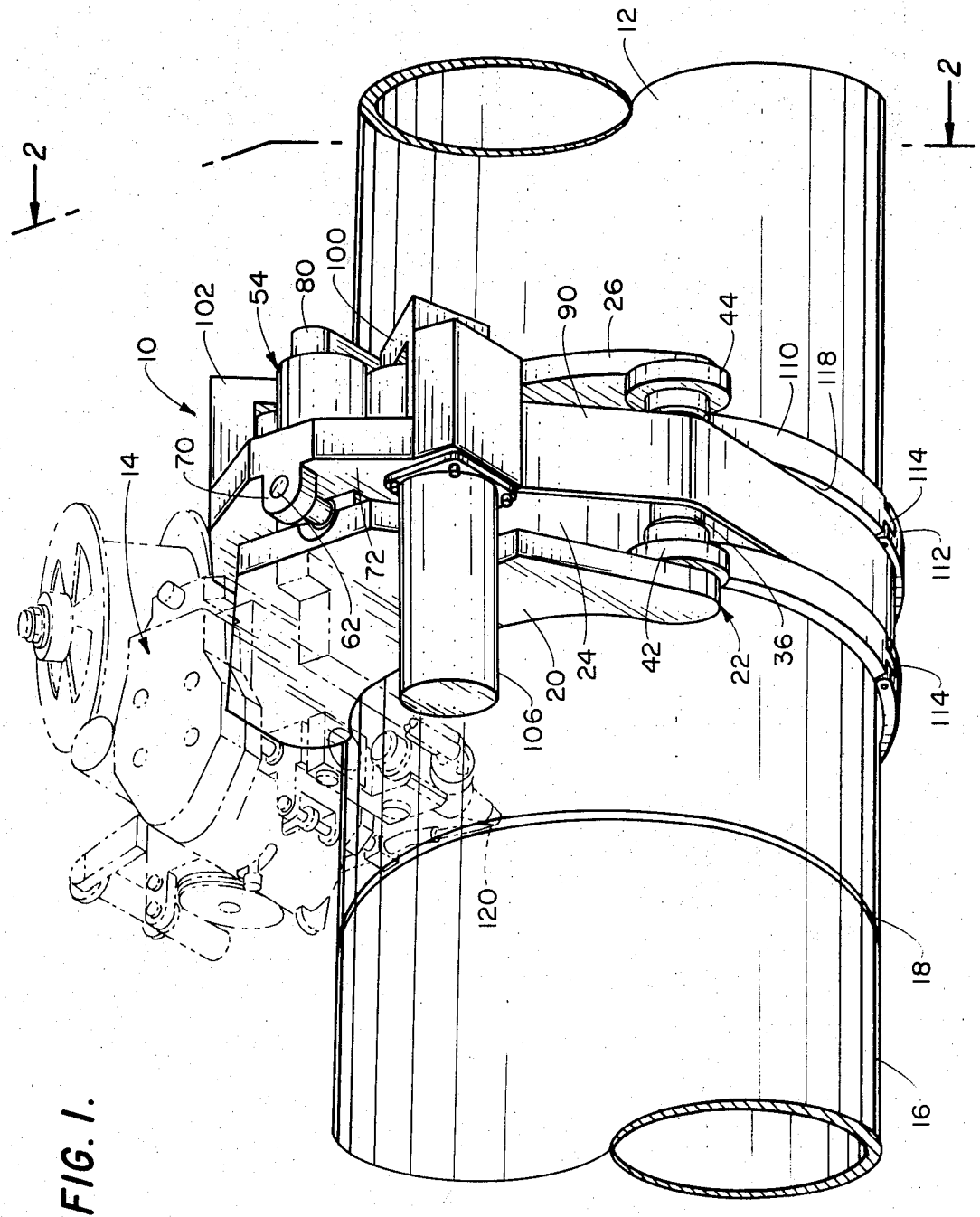
FIG. 1 is an overall view of the supporting apparatus of this invention showing such as employed in combination with the welding head apparatus.

Referring particularly to the drawings, there is shown in FIG. 1 the supporting apparatus 10 of this invention which is fixedly secured with respect to a first cylindrical tube 12. A welding head apparatus 14, shown in phantom in FIG. 1, is to be fixedly positioned with respect to the supporting apparatus 10 and is adapted to effect welding of the first cylindrical tube 12 to a second cylindrical tube 16. It is to be understood that the welding head apparatus 14 in and of itself does not form any specific part of this invention. Basically, the welding head apparatus 14 could take any of numerous forms. It is envisioned that the welding head apparatus 14 could provide for welding of the first cylindrical tube 12 to the second cylindrical tube 16 by the gas tungsten arc-welding process. The welding head apparatus 14 is to effect a welding bead 18 to result in the integral connection between the first cylindrical tube 12 and the second cylindrical tube 16.

The welding head apparatus 14 is fixedly secured to the plate 20 of the guide roller housing 22. The guide roller housing 22 also includes a main supporting member 24 which is integrally connected to the plate 20. A plate 26 is also fixedly secured by means of bolts 28 to the main supporting member 24.

Located adjacent each end of the plate 26 are pins 30 and 32. Each of the pins 30 and 32 are fixedly secured within the plate 26 and at the free end thereof are fixedly secured to plate 20.

Rotatably mounted upon the pin 30 is a first small diameter roller 34. Also rotatably mounted upon the pin 32 is a similar small diameter roller 36. Also rotatably mounted upon the pin 30 and on each side of the roller 34 are guide rollers 38 and 40. Similarly rotatably mounted upon the pin 32 are guide rollers 42 and 44 on each side of the roller 36. The function of the rollers 34 through 44 will be described further on in the specification.

Located within the recess 46 formed within the main supporting member 24 is a compression spring 48. The free end of the compression spring 48 matingly cooperates within recess 50 formed within a main element 52 of a drive roller housing 54. A first guide pin 56 is fixed by means of set screw 58 within the main element 52. The free end of the guide pin 56 is conducted through a bearing element 60. The bearing element 60 is fixedly retained within the main supporting member 24 of the guide roller housing 22.

A second guide pin 62 is fixedly positioned by means of set screws 64 and 66 within their respective bifurcated legs 68 and 70. The bifurcated legs 68 and 70 are integrally connected to an apex element 72 which is integrally connected to the main element 52 of the drive roller housing 54. A bearing element 74 cooperates with the second guide pin 62 intermediate the legs 68 and 70. The bearing element 74 is fixedly secured within the upper end of the plate 20. The second guide pin 62 also cooperates within a bearing element 76 formed within the main supporting member 24.

A pin 78 is fixedly mounted within apex element 72 and upstanding portion 80 of the main element 52. A set screw 82 cooperates within the upstanding portion 80 to fixedly retain the pin 78. A first drive roller 84 is rotatably mounted by means of roller bearings 86 and 88 upon the pins 78. The first drive roller 84 is to be of sufficient length so as to cooperate with the flexible band 90. One end of the first drive roller 84 has a plurality of gear teeth 92 formed thereon.

Located on each side of the first drive roller 84 are second and third drive rollers 94 and 96, respectively. A pin 98 is fixedly positioned within the apex elements 72 and the extension 100 rotatably supports the second drive roller 94 by means of bearings not shown. The extension 100 is fixedly secured to the main element 52. In a similar manner, an extension 102 is fixedly secured to the main element 52 with a pin 104 being fixedly mounted between the extension 102 and the apex element 72. The third drive roller 96 is rotatably supported by means of bearings (not shown) about the pin 104. It is to be noted that both the second drive roller 94 and the third drive roller 96 include a plurality of gear teeth formed thereon similar to the gear teeth 92. The gear teeth of each of the rollers 84, 94 and 96 cooperate in a driving connection therebetween.

A motor 106 is secured to the apex element 72. The drive shaft (not shown) of the motor 106 extends through the apex element 72 and is connected to a main drive gear (not shown). The main drive gear is operatively connected to the gear teeth formed on the second drive roller 94. As a result, upon operation of motor 106, clockwise rotation of the second drive roller 94 occurs which in turn cause counterclockwise rotation of the first drive roller 84 which in turn causes clockwise rotation of the third drive roller 96.

A clamp 108, composed of elements 110 and 112, is capable of being located about in a tight-fitting manner, the first cylindrical tube 12. The elements 110 and 112 are hingedly connected together through a hinge 114. It is to be noted that each of the elements 110 and 112 generally take the form of a semicircle. The free end of each of the elements 110 and 112 are securable together by means of bolts 116. By the adjusting of the bolts 116, the tight fitting connection of the clamp 108 is varied upon the tube 12.

An annular recess 118 is formed around the entire clamp 108 within each of the elements 110 and 112. The annular recess 118 is to retain the flexible band 90 therein as it is positioned around the clamp 108.

The operation of the welding head supporting apparatus of this invention is as follows: It will be assumed that an operator desires to join together by welding the first cylindrical tube 12 to the second cylindrical tube 16. The operator first grasps the clamp 108 and separating the elements 110 and 112 about the hinge 114, places such around the first cylindrical tube 12. The bolts 116 are then tightened sufficiently so that the elements 110 and 112 are firmly secured to the cylindrical tube 12. The clamp 108 is to be positioned longitudinally upon the tube 12 so that the welding tip 120 of the welding head apparatus 14 be located directly adjacent the end of the tube 12 which is to be secured to the tube 16. With the clamp 108 so installed, the operator then places the enlarged rollers 38, 40, 42 and 44 in contact with the cylindrical tube 12 on opposite sides of the band 108 (as shown in the drawings). It is to be understood that the previously mentioned rollers are secured to the guide roller housing 22 with the drive roller housing 54 being also connected thereto.

Additionally, the welding head apparatus 14 has been previously connected to plate 20 of the guide roller housing 22.

The operator then grasps a previously determined length of the flexible band 90 and places such over the end of the tube 12. The operator then physically moves the drive roller housing 54 toward the guide roller housing 22 against the bias of spring 48. With the drive roller housing 54 in this position, the operator then takes the flexible band 90 and places such in contact with the drive rollers 84, 94, 96, as shown in FIG. 2 of the drawings. The operator also causes the band 90 to contact rollers 34 and 26 and fit within the annular recess 118. The operator then releases the drive roller housing 54 causing the movement of such with respect to the guide roller housing 22 to make the band 90 become taut. The length of the band is selected so that leg 68 of the drive roller housing 54 has not come into contact with bearing element 74. In other words, the leg 68 and the bearing element 74 defines the limit of movement of the drive roller housing 54 with respect to the guide roller housing 22.

The operator then locates the second cylindrical tube 16 directly adjacent the edge of the first cylindrical tube 12 and also directly adjacent the welding tube 120. The operator then actuates the welding head apparatus 14 to effect the welding of tube 16 to tube 12. Simultaneously with the actuation of the welding head apparatus 14, the operator effects actuation of motor 106. Motor 106 through appropriate gear teeth, including gear teeth 92, affect rotation of the drive rollers 84, 96 and 94. Rotation of the drive rollers is such that each of the drive rollers tend to move in the same direction along the flexible band 90. It is to be noted that because of the making taut of the flexible band 90 through the bias of the spring 48, the flexible band 90 is frictionally held in position within the annular recess 118. As a result of the rotation of the drive rollers, the drive roller housing 54 tends to move along the flexible band 90. Additionally, the guide roller housing 22 is moved along therewith with the enlarged rollers 38, 40, 42 and 44 being rotated upon the surface of the tube 12. The rollers 34 and 36 low frictionally support the band 90 with respect to the guide roller housing 22 so as to eliminate any frictional force therebetween which would tend to hinder the movement of the guide roller housing with respect to the tube 12 and the clamp 108.

Both the motor 106 and the welding head apparatus 14 are maintained activated until the apparatus 10 of this invention and the welding head apparatus 14 make a complete circle about the tube 12. During the making of this circle, the welding head apparatus 14 through the welding tube 120 will have produced the welding bead 18 resulting in the integral combining of the tubes 12 and 16.

It is to be understood that the motor 106 is selected so as to drive the welding head apparatus 14 at a particular velocity around the tube 12 to produce the highest quality weld bead 18. It is additionally understood that the motor 106 could be varied in speed so as to vary the velocity of such for the different types of materials to be welded.

What is claimed is:

1. A welding head supporting apparatus to produce a weld upon a circumferential workpiece comprising:

track means to guide said supporting apparatus in a prescribed path, said track means being substantially circular in configuration, said track means being formed of a first section and a second section, each of said first and second sections being hinged together at one end and securable together at the other ends by a fastening means;

guide roller means connected to said track means adapted to move therealong to guide said supporting apparatus in said prescribed path, said guide roller means comprises a plurality of separate guide roller units, at least two in number of said guide roller units being located exteriorly and on opposing lateral sides of said track means; and retention means to retain said guide roller means in connection with said track means, said retention means includes a flexible belt surrounding said first element and in frictional contact with said track means, said flexible belt being connected to said guide roller means.

2. The combination of claim 1 wherein:
an annular recess formed within said track means, said flexible belt to cooperate within said annular recess.

3. The combination of claim 1 wherein:
there being four in number of said guide roller units within said guide roller means, two of said guide roller units being rotatably mounted upon a first axle and two of said guide roller units being rotatably mounted upon a second axle, said first axle being spaced from said second axle, both said first and second axles being fixed within a guide roller housing.

4. The combination of claim 3 wherein:
said first axle and said second axle rotatably support a friction roller located intermediate said roller units, said friction roller to be in contact with said flexible band.

5. The combination of claim 1 including:
a drive roller housing being connected to said guide roller means and movable with respect thereto, said drive roller housing being under a constant bias to tend to move such to the maximum distance from said guide roller means.

6. The combination of claim 5 wherein:
said bias being supplied by means of a spring.

7. The combination of claim 5 wherein:
said drive roller housing including a drive roller, said drive roller being rotatable by means of a motor, said band being in contact with said drive roller.

8. The combination of claim 5 wherein:
said drive roller housing including a plurality of drive rollers, said flexible band being in contact with each of said drive rollers.

9. The combination as defined in claim 8 wherein:
each of said drive rollers being connected together through a gearing arrangement.

* * * * *